United States Patent
Yelton

(10) Patent No.: US 9,014,492 B2
(45) Date of Patent: Apr. 21, 2015

(54) REAL-TIME IMAGE RECONSTRUCTION

(71) Applicant: The Boeing Company, Chicago, IL (US)

(72) Inventor: Dennis Yelton, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 13/658,498

(22) Filed: Oct. 23, 2012

(65) Prior Publication Data

US 2014/0112588 A1  Apr. 24, 2014

(51) Int. Cl.
*G06K 9/36* (2006.01)
*G06K 9/46* (2006.01)
*G06T 3/40* (2006.01)

(52) U.S. Cl.
CPC ..................... *G06T 3/4007* (2013.01)

(58) Field of Classification Search
None
See application file for complete search history.

(56) References Cited

U.S. PATENT DOCUMENTS

| | | | |
|---|---|---|---|
| 6,188,804 B1 * | 2/2001 | Weldy et al. | ................ 382/300 |
| 7,148,861 B2 | 12/2006 | Yelton et al. | |
| 7,373,019 B2 | 5/2008 | Zomet et al. | |
| 7,983,465 B2 | 7/2011 | Leroux et al. | |
| 8,009,933 B2 | 8/2011 | Tanaka et al. | |
| 8,019,703 B2 | 9/2011 | Peot et al. | |
| 8,111,893 B2 | 2/2012 | Chen et al. | |
| 8,150,163 B2 | 4/2012 | Kruppa | |
| 8,189,095 B2 | 5/2012 | Gerwe | |
| 8,189,958 B2 | 5/2012 | Shi et al. | |
| 8,229,199 B2 | 7/2012 | Chen et al. | |
| 8,233,682 B2 | 7/2012 | Fessler et al. | |
| 2009/0097545 A1 * | 4/2009 | Ugur et al. | ................ 375/240.02 |
| 2010/0054620 A1 * | 3/2010 | Kobayashi | .................... 382/256 |

OTHER PUBLICATIONS

Lertrattanapanich, S. and Bose, N.K., High Resolution Image Formation From Low Resolution Frames Using Delaunay Triangulation, 2002, IEEE Transactions on Image Processing, vol. 11, No. 12, pp. 1427-1441.*
Boissannat et al., "Smooth Surface Reconstruction via Natural Neighbour Interpolation of Distance Functions," Proceedings of the 16th Annual Symposium on Computational Geometry, Hong Kong, Jun. 2000, ACM, New York, New York, Jun. 2000, pp. 223-232.
European Search Report dated Jan. 27, 2014 for European Application No. 13 182 590.3, 10 pages.

(Continued)

*Primary Examiner* — Stephen R Koziol
*Assistant Examiner* — Jonathan S Lee
(74) *Attorney, Agent, or Firm* — Womble Carlyle Sandridge & Rice, LLP

(57) ABSTRACT

An apparatus is provided that includes a processor (e.g., FPGA) configured to cause the apparatus to perform a number of operations. The apparatus may be caused to receive input data for a digital image represented by point samples at respective sample locations, reconstruct the digital image from the input data for presentation by a display including display pixels, and output the reconstructed digital image. The reconstruction may include a number of operations for each of at least some of the display pixels. In this regard, the apparatus may be caused to perform a convolution-based, point-sample encoding of a selected display pixel to generate an encoding that identifies point samples of the digital image nearby the selected display pixel. And the apparatus may be caused to interpolate a value of the selected display pixel from at least some of the identified point samples using the generated encoding.

24 Claims, 6 Drawing Sheets

(56) References Cited

OTHER PUBLICATIONS

Heikkila et al., "Description of Interest Regions with Center-Symmetric Local Binary Patterns," Jan. 2007, Computer Vision, Graphics and Image Processing Lecture Notes in Computer Science, Springer, Berlin, Germany, pp. 58-69.

Ledoux et al., "An Efficient Natural Neighbour Interpolation Algorithm for Geoscientific Modelling," 11th International Symposium on Spatial Data handling, Leicester, Aug. 23-25, 2004, vol. 11, Jan. 2005, pp. 97-108.

McLain, "Two dimensional interpolation from random data," The Computer Journal, 1976, vol. 19, No. 2, pp. 178-181.

Mojsilovic, "Color Quantization and Processing by Fibonacci Lattices," IEEE Transactions on Image Processing, vol. 10, No. 11, Nov. 2001, pp. 1712-1725.

Ojala et al., "A Comparative Study of Texture Measures With Classification Based on Feature Distributions," Pattern Recognition, Elsevier, GB, vol. 29, No. 1, Jan. 1996, pp. 51-59.

Pietikainen et al., "Local Binary Patterns for Still Images," Springer, 2011, Chapter 2, pp. 13-47.

Shepard, "A two-dimensional interpolation function for irregularly-spaced data," Proceedings of the 1968 23rd ACM National Conference, ACM, New York, New York, 1968, pp. 517-524.

Sheridan et al., "Pseudo-invariant image transformations on a hexagonal lattice," Image and Vision Computing, vol. 18, 2000, pp. 907-917.

Weisstein, "CRC Concise Encyclopedia of Mathematics," 2003, Chapman and Hall, pp. 558-559.

Yelton et al., "Processing System for an Enhanced Vision System," Proc. SPIE, vol. 5424, Aug. 2004, pp. 163-176.

Pharr et al, Physically Based Rendering From Theory to Implementation 2nd Ed., Jun. 28, 2010, pp. 279-367, Chapt 7, Morgan Kaufmann.

\* cited by examiner

REGION 1 CONVOLUTION: $2^3 + 2^6 + 2^{12}$ = 0000 0000 0001 0000 0100 1000

REAL-TIME IMAGE RECONSTRUCTION

TECHNOLOGICAL FIELD

The present disclosure relates generally to image processing and, in particular, to image processing in a vision display system used to provide a user with a visual display of a field of interest.

BACKGROUND

Despite the advent of many flight navigational aids, one of the most important tools for navigation of aircraft remains visual navigation. Many of today's aircraft include various safety features such as on board radar, ground proximity warning systems, and the like that provide a pilot with added information about the airspace surrounding the aircraft. These systems are a tremendous resource to aid the pilot in obtaining a better situational awareness during flight, by allowing the pilot to further interpret what he or she is visually observing. However, there are instances where these various instruments become the pilot's only resource of information because the pilot's vision is hindered.

Visual hindrances may be due to bad weather, such as fog, snow or rain, or they may be due to the time of day, such as night, dawn or dusk. Further, some visual hindrances are due to the field of view limitations of the aircraft itself. Many aircraft cockpits have a field of view that is typically limited to a forward facing area that does not provide the pilot with adequate visualization to the sides and rear of the aircraft and also does not provide adequate vertical visualization above and below the aircraft.

Obstructed vision is an important safety concern in aircraft navigation, and there has been considerable effort devoted to providing systems that increase or enhance a pilot's view from the cockpit. Systems have been developed that include the use of one or more sensors that are located on the aircraft. The sensors are directed toward a selected field of view and provide images to a display system in the cockpit, where they are, in turn, displayed to the pilot. The sensors may be video cameras, infrared cameras, radar, lidar or the like. The systems allow the pilot to choose the types of images to view. For example, in nighttime flight or fog conditions, the pilot may opt to view images from the infrared and radar sensors, while under clear conditions, the pilot may use video camera feeds.

Enhanced vision systems generally provide fairly accurate visual images to the pilot, and thereby increase flight safety. However, there are some limitations to these systems that can cause the images provided to the pilot to either be less accurate or include anomalies that may distract the pilot's view. One issue relates to the limitations of a particular type of sensor to provide suitable imaging for a given situation. For example, in twilight conditions, a video camera will still provide a discernable visual image, but the image will be degraded in detail due to the low light or obstructed conditions. An infrared sensor will provide imaging based on heat sensing, but the image from an infrared sensor will not have the benefit of the ambient light still available at twilight. In these and other similar situations, the sensor may acquire only sparse input data from which visual images are to be constructed, and further, the sparse input data may vary randomly from frame to frame of the image. This is common, for example, with lidar sensors.

BRIEF SUMMARY

Example implementations of the present disclosure are generally directed to an apparatus, method and computer-readable storage medium for real-time image reconstruction. Example implementations of the present disclosure generally permit the reconstruction of image structure and detail far beyond that distinguishable by human viewing of the raw input data in a very computationally-efficient manner. This may therefore allow real-time reconstruction of sparsely sampled video data with very low latency even for very large images. According to one aspect of example implementations, an apparatus is provided that includes a processor configured to cause the apparatus to perform a number of operations. In one example, the processor includes a parallel-based processor such as a field programmable gate array (FPGA).

In one example, the apparatus may be caused to receive input data for a digital image represented by a plurality of point samples at respective sample locations, reconstruct the digital image from the input data for presentation by a display including a plurality of display pixels, and output the reconstructed digital image. The reconstruction may include a number of operations for each of at least some of the display pixels. In this regard, the apparatus may be caused to perform a convolution-based, point-sample encoding of a selected display pixel to generate an encoding that identifies point samples of the digital image nearby the selected display pixel. And the reconstruction may include the apparatus being caused to interpolate a value of the selected display pixel from at least some of the identified point samples using the generated encoding.

In some example implementations, the apparatus may be caused to receive the input data, reconstruct the digital image and output the reconstructed digital image for a plurality of digital images in a collection of digital images. In these example implementations, the sample locations of the point samples may vary across at least some of the digital images of the collection.

In some example implementations, the apparatus being caused to perform the convolution-based, point-sample encoding may include the apparatus being caused to convolve a kernel with a binary sample representation of the digital image. This convolution may be performed to generate a convolution result as the encoding. And in these example implementations, the kernel may include a grid of pixels each of which has a value representing a distance of the pixel from a center pixel of the kernel.

In further example implementations, the display pixels may include sampled display pixels corresponding to respective point samples, and unsampled display pixels. The binary sample representation may therefore include pixels corresponding to sampled display pixels, and pixels corresponding to unsampled display pixels. In this regard, each pixel that corresponds to a sampled display pixel may have a binary value of 1, and each pixel that corresponds to an unsampled display pixel may have a binary value of 0.

Additionally or alternatively, in further example implementations, the convolution result may be representable as a multi-bit binary integer in which each bit corresponds to a respective display pixel in an area about the selected display pixel. In these examples, a bit value of 1 may indicate the presence of a point sample at the respective display pixel, and a bit value of 0 may indicate the absence of a point sample at the respective display pixel.

In some example implementations, the apparatus being caused to interpolate the value may include being caused to use the generated encoding to identify a set of point samples forming a polygon enclosing the selected display pixel, and interpolate the value of the selected display pixel based on the point samples of the respective set. In a more particular example implementation, the apparatus may be caused to use the generated encoding to identify a set of three point samples, and interpolation of the value may include performing a triangular interpolation.

In other aspects of example implementations, a method and computer-readable storage medium are provided for image reconstruction. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

Figure 8:
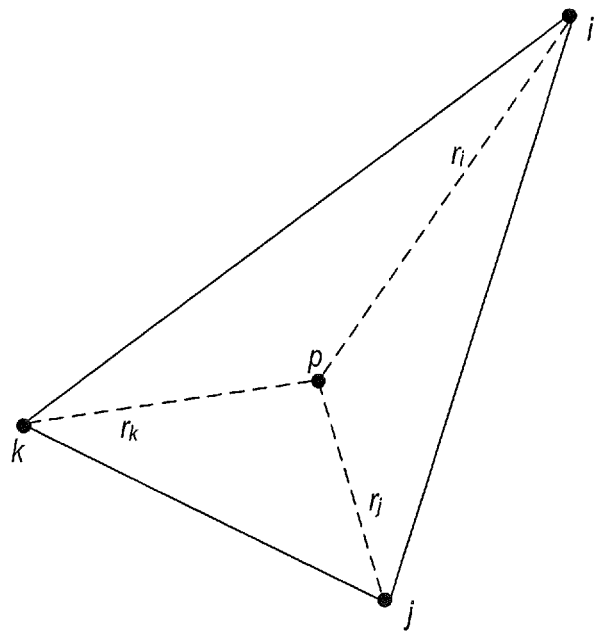
FIG. 8 illustrates an example of three point samples forming a triangle with vertices (i, j, k), and a selected display pixel at point p, according to one example implementation of the present disclosure.
Figure 9:
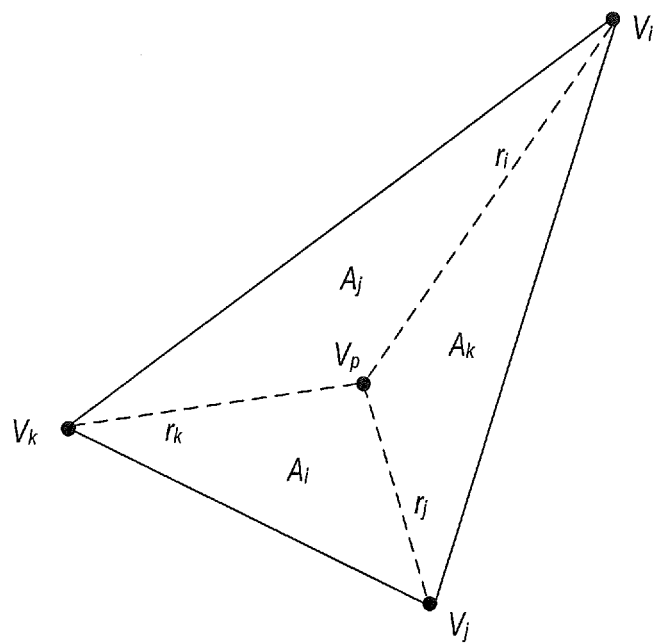
Figure 10:
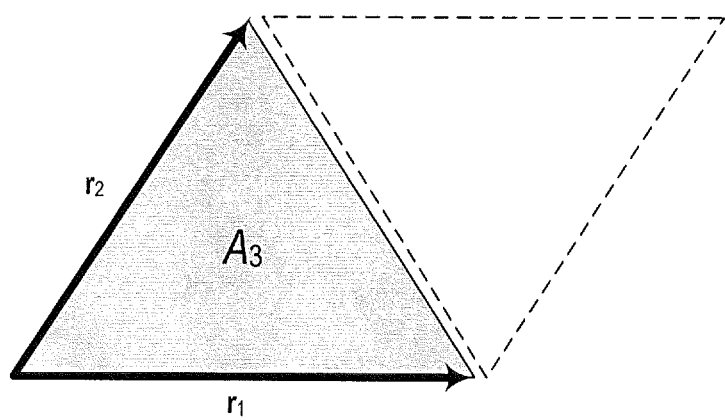

FIG. 9 illustrates the example point samples and selected display pixel of FIG. 8, and further illustrates areas formed within the triangle formed by the point samples, according to one example implementation of the present disclosure; and FIG. 10 illustrates the area of a parallelepiped including two vectors as sides equals the magnitude of the cross product of the two vectors, which is twice the area of the triangle including the vectors as sides, according to one example implementation of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure relate generally to image processing. Example implementations will be primarily described in conjunction with aerospace applications. It should be understood, however, that example implementations may be utilized in conjunction with a variety of other contexts, both in the aerospace industry and outside of the aerospace industry. Example implementations may be utilized in any of a number of other contexts that include or otherwise would benefit from image processing. These other contexts include, for example, consumer electronics, medical, defense, manufacturing, space or the like.

Figure 1A:
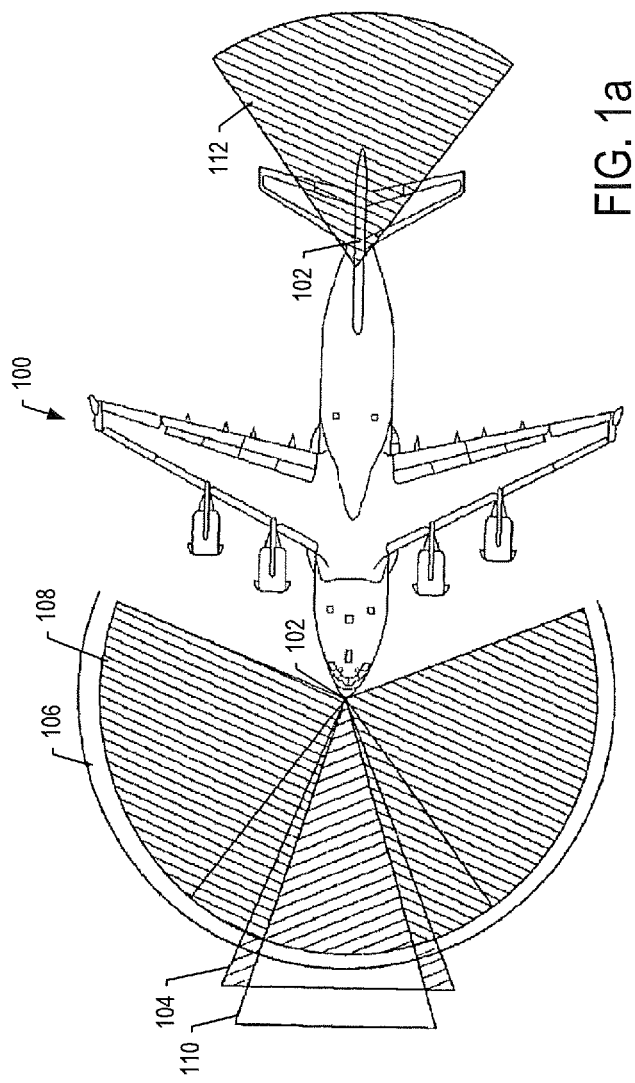
FIGS. 1a and 1b illustrate top and side views of an aircraft that may benefit from example implementations of the present disclosure.
Figure 1B:
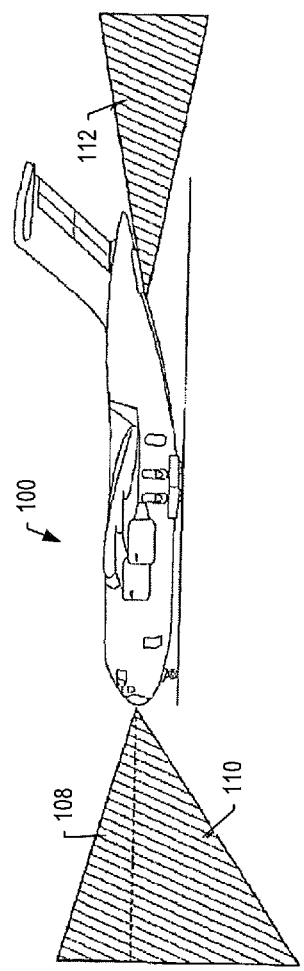

FIGS. 1a and 1b illustrate an aircraft 100 in which example implementations of the present disclosure may be incorporated. As shown, a system may be provided that includes one or more sensors 102 located at various positions on the aircraft. The sensors may be located at the front of the aircraft in different orientations to provide various forward 104, side 106, upward 108 and downward views 110. Further, in some implementations, sensors may be located in the rear of the aircraft for rear views 112. While not illustrated, various sensors may also be located on the wings, top and bottom sides of the aircraft. Typical sensors used with the system are low-light level video cameras, long-wave infrared sensors, lidar and millimeter wave radar, to name a few.

Figure 2:
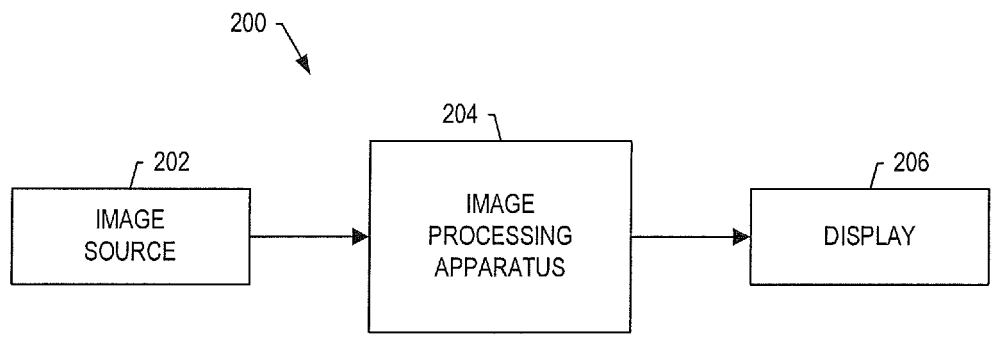
FIG. 2 is a schematic block diagram of a system according to one example implementation of the present disclosure.

FIG. 2 illustrates a system 200 according to one example implementation. As shown, the system may include one or more image sources 202, one or more of which in one example may correspond to sensor(s) 102 located on the aircraft 100 of FIG. 1. In other examples, the source(s) may include storage such as file storage, database storage, cloud storage or the like. The source(s) may be coupled to an image processing apparatus 204, which may be responsible for reconstructing various images from input data received from the source(s) for display. The image processing apparatus may also be coupled to a navigation system configured to provide positional information, (i.e., longitude, latitude, pitch, roll, yaw, etc.), related to the aircraft.

As also shown, the system 200 may include a display 206 coupled to the image processing apparatus 204. In one example implementation, the display may be a helmet-mounted display located in the helmet of the pilot or other viewer, and it may be associated with a helmet tracker for providing information concerning the present line of sight of the user relative to the aircraft. It should be understood, however, that a helmet tracker is not required for the disclosure, and that the display may take any of a number of forms other than a head-mounted display.

Figure 3:
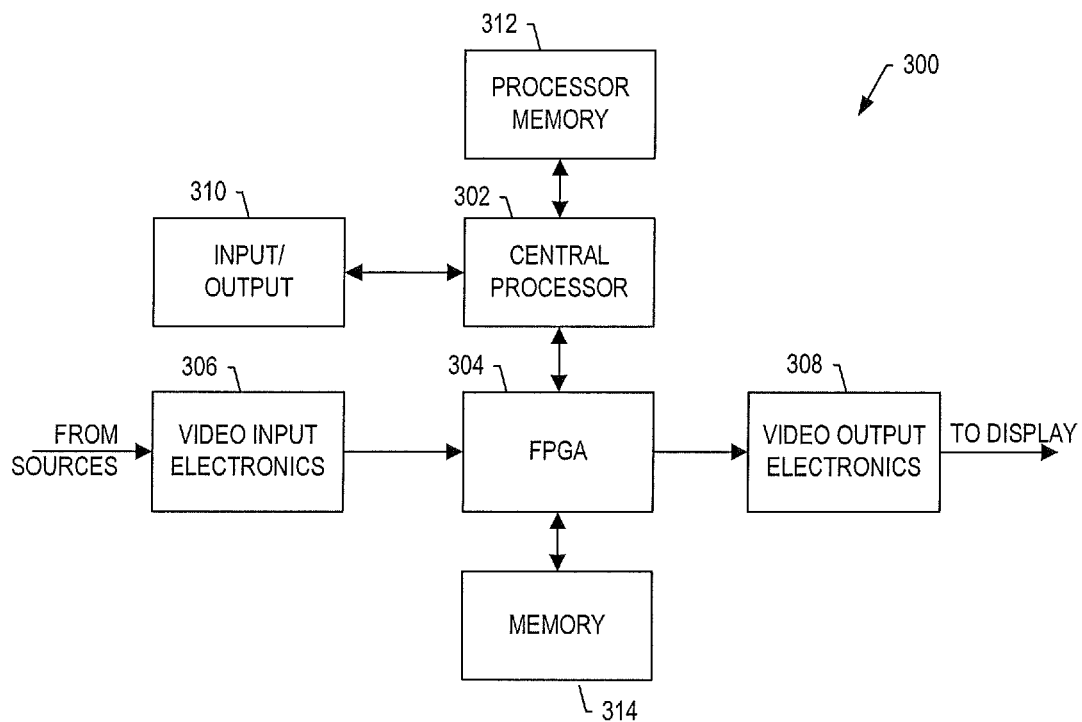
FIG. 3 is a schematic block diagram of an image processing apparatus according to one example implementation of the present disclosure.

FIG. 3 illustrates an image processing apparatus 300, which in one example may correspond to the image processing apparatus 204 of FIG. 2. As shown, the image processing apparatus may include a serial-based central processor 302, and a parallel-based processor such as a field programmable gate array (FPGA) 304. The FPGA may include or otherwise be coupled to image input electronics 306 coupled to one or more image sources such as one or more image sources 202, and image output electronics 308 coupled to a display such as display 206. The image processing apparatus may also include an input/output interface 310 coupled to the central processor for receiving input from one or more components such as a navigation system, helmet tracker or the like, as well as various pilot input commands. The central processor and FPGA may also include or be otherwise coupled to respective memory 312, 314.

The image processing apparatus 300 of one implementation of the present disclosure includes both a central processor 302 and an FPGA 304, and may partition the computational workload between them. Rate-limiting calculations may be allocated to the FPGA, and other calculations may be allocated to the central processor. This workload allocation may allow the image processing apparatus of example implementations to operate with decreased latency. For example, upon initialization, the central processor may pre-calculate and store many of the calculations required for the display of images from the source. A parallel-based processor such as an FPGA may efficiently handle the processing of input data from the source and correlating this data with the display. The FPGA can process input data as it is received on a pixel-by-pixel basis, thereby decreasing the latency of the system. This allocation between the two types of processing elements may allow the system and method of example implementations to operate with a latency of less than image frame (sub-frame latency).

It should be understood that any type of serial-based processing hardware can be used for the functions of the central processor 302 described herein. Similarly, it should be understood that any type of parallel-based processor or other similar hardware can be used to perform the functions described herein relating to the FPGA 304, and that an FPGA is only used herein as an example.

Returning to FIG. 2, in accordance with example implementations of the present disclosure, a source 202 may generate or otherwise provide input data for a multi-dimensional (e.g., two-dimensional) digital image that may stand alone or form part of a collection of digital images such as in the context of a video including frames of images. In one example, the source may be configured to generate input data for video at rates exceeding 100 Hz, although lower frame rates are possible.

A digital image may be represented by a plurality of pixels ("image pixels"). These image pixels may be considered point samples of the digital image at respective sample locations or positions, and the input data may include a plurality of point samples. In one example, the point samples may be intensity values at respective sample locations. The image processing apparatus 204 may be generally configured to reconstruct the digital image from the input data for presentation by the display 206. The display may include a plurality of pixels ("display pixels"), which may be arranged in a multi-dimensional (e.g., two-dimensional) grid. In this regard, the image processing apparatus may be configured to calculate values for the display pixels based on the point samples from the input data. Similar to the point samples, in one example the calculated values of the display pixels may be intensity values.

The point samples of the digital image may correspond to respective ones of the display pixels, which may accordingly be considered sampled display pixels. The display 206 may include more display pixels than there are point samples in the input data, however, and so others of the display pixels may be considered unsampled display pixels. Although the number of point samples relative to display pixels may vary from instance to instances, at times the number of point samples may be sparse in comparison. And in the context of a collection of images (e.g., video), the locations of the point samples may vary from image to image such as in a predefined or random manner.

As explained in greater detail below, reconstruction of an image may include the image processing apparatus 204 being configured to interpolate the display pixels from the point samples. In accordance with example implementations, the image processing apparatus may be configured to perform an interpolation at a display-pixel level using a convolution-based, point-sample placement encoding scheme to identify point samples forming a polygon such as a triangle enclosing the display pixel. In various examples, the image reconstruction may be performed by a parallel-based processor such as an FPGA 304, which generally excels at convolutions. This may therefore facilitate the sub-frame latency for image reconstruction according to example implementations of the present disclosure.

Figure 4:
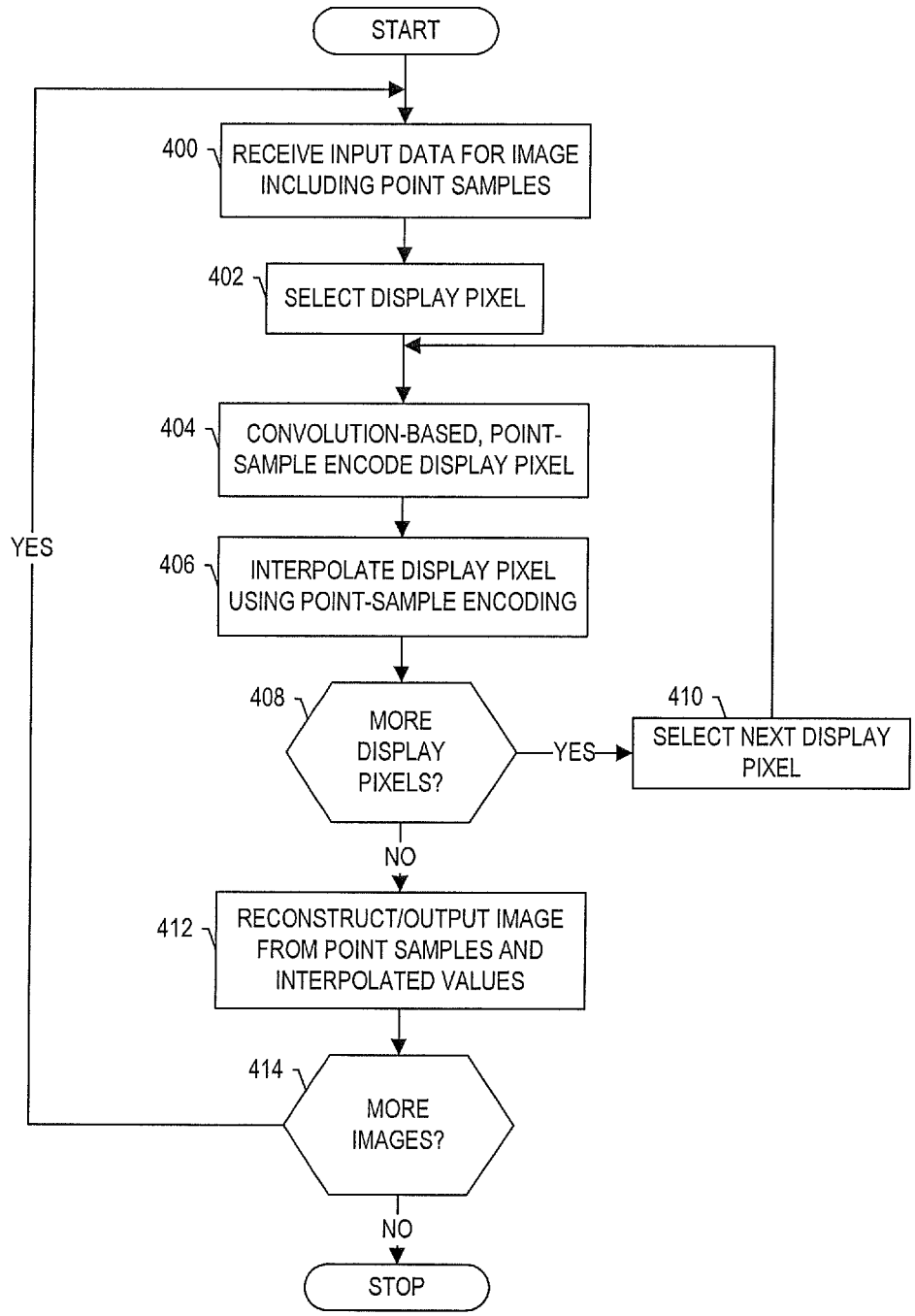
FIG. 4 illustrates a flowchart including various operations in a method according to example implementations of the present disclosure.

Reference is now made to FIG. 4, which illustrates a flowchart including various operations in a method of reconstructing a digital image according to one example implementation of the present disclosure. As shown at block 400, the method may include receiving input data for a multi-dimensional (e.g., two-dimensional) image from a source 202. As explained above, the input data may include point samples at respective sample locations of the image, which in one example may correspond to respective pixels (sampled display pixels) of a display 206. But again, the input data may include fewer point samples than display pixels, thereby leaving at least some of the display pixels unsampled.

The method may include reconstructing the digital image from the input data for presentation by a display including a plurality of display pixels. This reconstruction may include one or more operations for each of at least some of the display pixels. In this regard, the method may include selecting a display pixel and performing a convolution-based, point-sample encoding of the display pixel to generate an encoding that identifies point samples of the digital image nearby the selected display pixel, as shown in blocks 402 and 404. The method may also include interpolating a value of the selected display pixel from at least some of the identified point samples using the generated encoding, as shown in block 406.

In one example, the convolution-based, point sample encoding (block 404) may include convolving a kernel with a binary sample representation of the digital image to generate a convolution result as the encoding. The kernel may include a grid of pixels each of which has a value representing a distance of the pixel from a center pixel of the kernel. In this regard, the convolution kernel may include a multi-dimensional (e.g., two-dimensional) grid of pixels one of which may be the center pixel. The kernel center pixel may have a value of 1, and each other kernel pixel may have a value representing its distance from the center pixel. In one example, the value for any kernel pixel may be a binary integer $2^R$, where R represents a range-order number of the pixel from the kernel center. In this example, the center pixel may have a range-order number R=0, the pixel next closest to the center pixel may have a range-order number R=1, and so forth. Also in this example, pixels equidistant from the center pixel may be assigned consecutive range-order numbers. The range-order number R of a pixel may therefore more particularly represent the log base-2 of the kernel value of the respective pixel.

Figure 5:
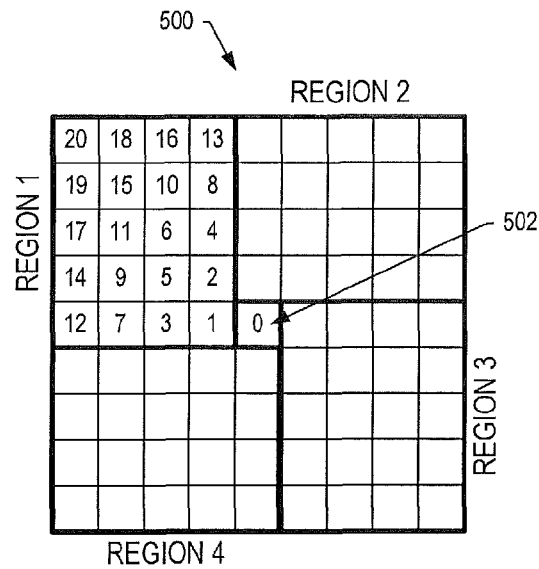
FIG. 5 illustrates an example convolution kernel according to one example implementation of the present disclosure.

In one example, the convolution kernel may be segmented into a plurality of regions, each of which may be independently valued. FIG. 5 illustrates a convolution kernel 500 including 81 pixels segmented into four regions about a center pixel 502, which may be shared by the four regions. As shown, the numbered elements may represent the log-base-2 of the corresponding region 1 kernel elements and the kernel values for the un-numbered elements are all zero. As shown, the pixels of region 1 may be assigned range-order numbers R=0, 1, 2, 3, . . . 20, which may again represent the log base-2 of respective kernel values. The kernel values may therefore have respective binary values:

$R = 0$:  0000 0000 0000 0000 0000 0001

$R = 1$:  0000 0000 0000 0000 0000 0010

-continued

```
R = 2:   0000 0000 0000 0000 0000 0100

...      ...

R = 20:  0001 0000 0000 0000 0000 0000
```

Similar to region 1, each of regions 2, 3 and 4 may be similarly assigned range-order numbers R=0, 1, 2, 3, . . . 20, and may have similar respective binary values (not separately shown in FIG. 5). In looking at each region, in one example, the kernel values for pixels of the other regions may be set to 0.

Figure 6:
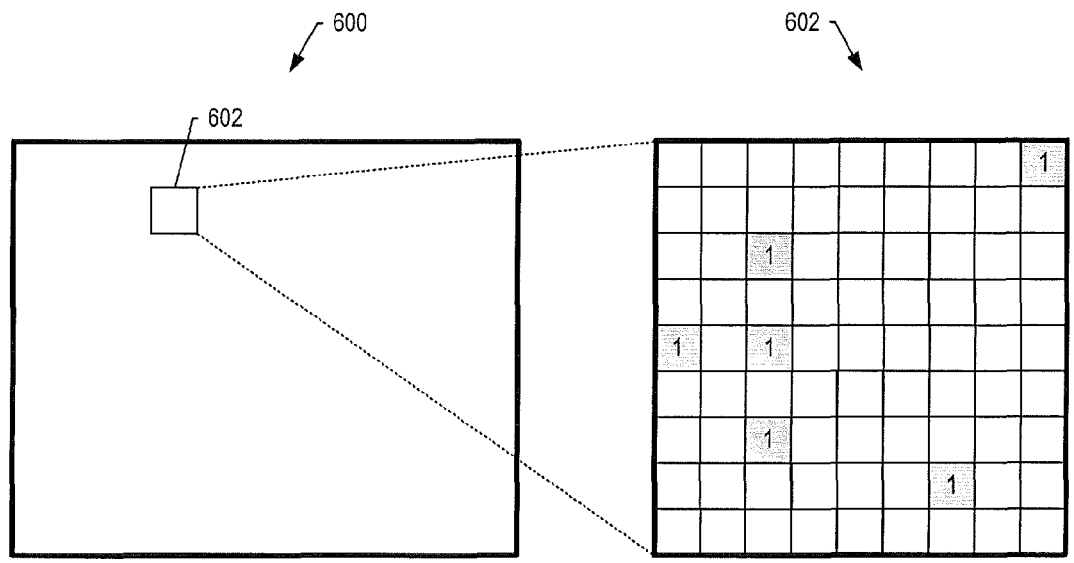
FIG. 6 illustrates a binary sample representation and the pixels of an exploded area of the representation according to one example implementation of the present disclosure.

The binary sample representation of the digital image may include a multi-dimensional (e.g., two-dimensional) grid of pixels corresponding to the display pixels. The binary sample representation may include pixels corresponding to sampled display pixels (having point samples at their locations), and pixels corresponding to unsampled display pixels (without point samples at their locations). In one example, in the binary sample representation, each pixel that corresponds to a sampled display pixel may have a binary value of 1, and each pixel that corresponds to an unsampled display pixel may have a binary value of 0. FIG. 6 illustrates a binary sample representation 600 and the pixels of an exploded area 602 of the representation. As shown, the exploded area includes six sampled pixels each of which has a value of 1, and the remaining unsampled pixels each of which has a value of 0 (for clarity, the 0 values have been omitted from the figure).

Figure 7:
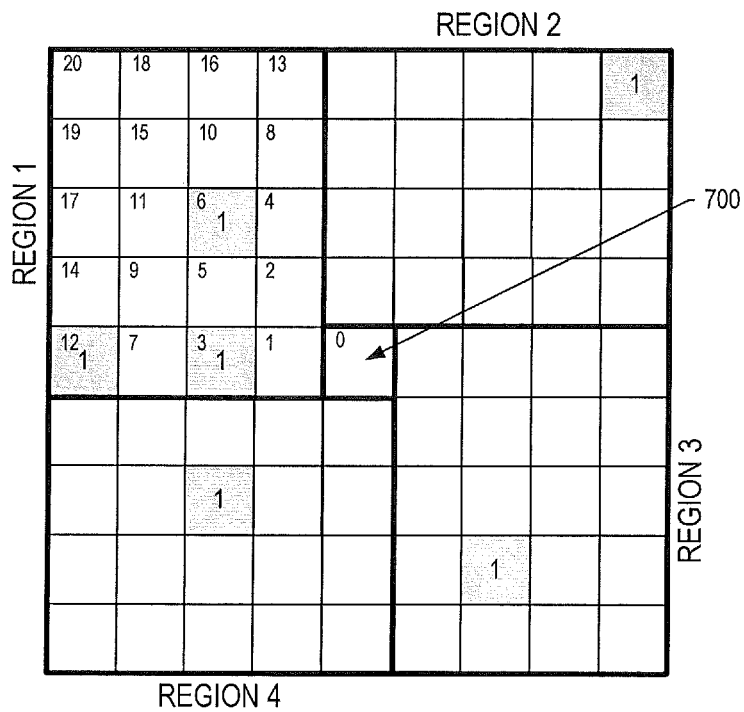
FIG. 7 illustrates the example convolution kernel of FIG. 6 overlaying the exploded area of FIG. 6, according to one example implementation of the present disclosure.

The convolution operation may be performed on a selected pixel of the binary sample representation corresponding to the selected display pixel. The operation may include overlaying the convolution kernel on an area of the binary sample representation such that the kernel center pixel is matched with the selected pixel of the binary sample representation (corresponding to the selected display pixel). FIG. 7 for example illustrates the kernel 500 of FIG. 5 overlaying the area 602 in the binary sample representation 600 of FIG. 6. The value of each pixel in the respective area of the binary sample representation may then be multiplied by the value of the corresponding pixel in the overlying kernel, and the products may be summed to generate a convolution result for the selected display pixel, shown at 700 in FIG. 7.

By the valuing of the kernel and binary sample representation pixels as explained above, the convolution result for the selected display pixel may be a value that encodes a pattern of point samples in the area about the selected display pixel corresponding to the kernel. The value of the convolution result may be represented in a number of different manners. In one example, the value may be representable as a multi-bit binary integer. In this example, each bit of the convolution result may correspond to a respective display pixel in the area about the selected display pixel. A bit value of 1 may indicate the presence of a point sample at the respective display pixel (sampled display pixel), and a bit value of 0 may indicate the absence of a point sample at the respective display pixel (unsampled display pixel). Lesser significant bits of the convolution result may indicate point samples closer to the selected display pixel than more significant bits. Continuing the above examples of FIGS. 5-7, for the selected display pixel at the kernel center pixel (R=0), the convolution result for region 1 may be $2^3+2^6+2^{12}=0000\ 0000\ 0001\ 0000\ 0100\ 1000$. The selected display pixel may include similar convolution results for regions 2, 3 and 4 based on the locations of the samples in those regions.

Returning to FIG. 4, as or after generating a convolution result to point-sample encode the selected display pixel, the method may include interpolating a value of the selected display pixel using the convolution result as the point-sample encoding, as shown in block 406. In one example, this may include interpolation in which the point-sample encoding may be used to identify one or more sets of nearby point samples that form polygons enclosing the selected display pixel. A value of the selected display pixel may then be calculated by performing an interpolation based on the point samples of one or more of the respective set(s). In one particular example described below, the interpolation may be a triangular interpolation in which the point-sample encoding may be used to identify set(s) of three nearby point samples that form triangles enclosing the selected display pixel.

The set(s) of point samples enclosing the selected display pixel may be identified in any of a number of different manners, where the selected display pixel may be considered enclosed by a triangle if its center is on or within the triangle. In one example, the set(s) may be identified by identifying one or more candidate sets of three nearby point samples from the point-sample encoding, and selecting those candidates defining triangles enclosing the selected display pixel (or otherwise ignoring those failing to define enclosing triangles). In examples in which the convolution kernel is segmented into regions each of which has its own convolution result, the candidate sets may be identified by taking different combinations of point samples in three of the regions. In the context of a kernel having four regions, a point sample in each of the four regions may guarantee at least one triangle enclosing the selected display pixel.

A set of point samples may be selected as enclosing the selected display pixel in any of a number of different manners. In one example, vectors from the point samples to the selected display pixel may be defined, and the signs of their different combinations of vector cross products compared to identify sets whose combinations of vector cross products all have the same sign. As shown in FIG. 8, consider an example of three point samples forming a triangle with vertices (i, j, k), and a selected display pixel at point p. In this example, $r_i$ represents a vector from p to i, $r_j$ represents a vector from p to j, and $r_k$ represents a vector from p to k. Also in this example, the selected display pixel may be enclosed by the triangle if and only if $(r_i \times r_j)$, $(r_j \times r_k)$ and $(r_k \times r_i)$ all have the same sign or if any of them is zero. Notably, in various instances the selected display pixel may have a point sample at its location; that is, the selected display pixel may itself be a sampled display pixel. In these instances, the vectors and their cross products may all have a value of 0, and with the same sign, the single point sample may be treated as a triangle (infinitesimally small) enclosing the selected display pixel.

The triangular interpolation may be performed to calculate a value of the selected display pixel, and may be performed based on the point samples of a set enclosing the selected display pixel in a number of different manners. And in one example, the interpolation may be performed weighted according to proximity of the point samples of the set to the selected display pixel. Referring to FIG. 9, and continuing the example of FIG. 8, in a further example in which the point samples have intensities $V_i$, $V_j$ and $V_k$, an interpolated intensity of the selected display pixel $V_p$ may be calculated as follows:

$$V_p = \frac{A_i V_i + A_j V_j + A_k V_k}{A_i + A_j + A_k} \tag{1}$$

In the preceding, $A_i$, $A_j$ and $A_k$ represent the areas of triangles defined by the two vertices opposite the respective point samples and the selected display pixel. Thus, $A_i$ represents the area of the triangle with vertices (p, j, k), $A_j$ represents the area of the triangle with vertices (p, k, i), and $A_k$ represents the area of the triangle with vertices (p, i, j).

As shown in FIG. 10, the area of a parallelepiped including two vectors as sides equals the magnitude of the cross product of the two vectors, which is twice the area of the triangle including the vectors as sides. The area of a triangle A including vector $r_1$ (composed of components $x_1$, $y_1$) and vector $r_2$ (composed of components $x_2$, $y_2$) as sides may therefore reduce to the following:

$$A = \frac{1}{2}|r_1 \times r_2| = \frac{1}{2}|x_1 y_2 - x_2 y_1| \qquad (2)$$

Rewriting the areas in (1) as per (2) results in the following:

$$V_p = \frac{|x_j y_k - x_k y_j|V_i + |x_i y_k - x_k y_i|V_j + |x_i y_j - x_j y_i|V_k}{|x_j y_k - x_k y_j| + |x_i y_k - x_k y_i| + |x_i y_j - x_j y_i|} \qquad (3)$$

In one example, the calculation of equation (3) or even that of equation (1) above may be performed by the FPGA 304. In this regard, the calculation may reduce to simple multiply-accumulate operations in which FPGA technology excels, and may include a division operation that may be performed by the FPGA using a number of known techniques such as those based on lookup tables or the like.

In examples in which only one set of point samples form a triangle enclosing the selected display pixel, the value (e.g., intensity) of the selected display pixel may be calculated according to either equation (1) or (3). In other examples in which more than one set of point samples enclose the selected display pixel, the value of the selected display pixel may be calculated from the respective equation(s) for one or more of the sets according to the respective equation(s). For example, the value of the selected display pixel may be calculated from the respective equation(s) for the set forming the smallest (by area) triangle enclosing the selected display pixel. And in a further example in which two or more triangles are equally the smallest, the value of the selected display pixel may be calculated as the mean of values calculated from the respective equation(s) for the respective two or more triangles.

Even further, note again that in various instances the selected display pixel may have a point sample at its location (i.e., the selected display pixel is a sampled display pixel). In these instances, intensities $V_i$, $V_j$ and $V_k$ may all be the same value—namely, the point sample at the location of the selected display pixel. Equations (1) and (3) may then reduce to the value of the selected display pixel equaling the point sample at its location.

In other examples, the selected display pixel may not have a point sample at its location, and no triangles are found to enclose the respective display pixel. In these examples, the selected display pixel may be treated in a number of different manners. In one example, the selected display pixel may have a value of zero, and may present a void in the reconstructed image. Choosing an appropriate kernel size, however, may largely reduce these instances, although they may still remain near the edges of the image.

The method may continue by selecting another display pixel and repeating the above operations to calculate its value, as shown at blocks 408, 410, and back again at blocks 404, 406. The image may then be reconstructed from the point samples and calculated values of the display pixels, as shown in block 412, and may be output such as for storage or presentation by the display 206. In instances in which the image is one of a collection of images (e.g., video), the method may then turn to another image in the collection, as shown in block 414, and then returning to block 400. The above operations proceed by point-sample encoding and interpolating each display pixel individually. It should be understood, however, that in another example the operations may instead by proceed by point-sample encoding at least some if not all of the display pixels before interpolating the respective display pixels.

According to example implementations of the present disclosure, the system 200 including its image processing apparatus 204 may carry out operations such as those illustrated in FIG. 4 by various means. These means may include hardware, alone or under direction of data, program instructions, program code, computer program code, computer-readable program code, executable computer-readable program code or the like (generally "computer programs," e.g., software, firmware, etc.). This hardware may include a processor such as central processor 302 or FPGA 304 executing computer programs stored in a non-transitory computer-readable storage medium such as processor memory 312 or memory 314. In one particular example implementation, the operations performed according to the flowchart of FIG. 4 may be performed by the FPGA 304 executing software stored in memory 314.

More generally, according to example implementations, any suitable computer program(s) may be more generally loaded onto a computer or other programmable apparatus (e.g., central processor 302, FPGA 304) from a computer-readable storage medium (e.g., processor memory 312, memory 314) to produce a particular machine, such that the particular machine becomes a means for implementing one or more functions specified herein. The computer program(s) may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which this disclosure pertains having the benefit of the teachings presented in the foregoing description and the associated drawings. For example, example implementations of the present disclosure set forth herein may be used in lieu of or in addition to other image processing techniques such as super-resolution, post-processing image enhancement or the like. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
a processor configured to cause the apparatus perform a number of operations, the apparatus being caused to at least:
receive input data for a digital image represented by a plurality of point samples at respective sample locations;
reconstruct the digital image from the input data for presentation by a display including a plurality of display pixels, the reconstruction including for each of at least some of the display pixels, the apparatus being caused to at least:
perform a convolution-based, point-sample encoding of a selected display pixel to generate an encoding that identifies point samples of the digital image nearby the selected display pixel; and
interpolate a value of the selected display pixel from at least some of the identified point samples using the generated encoding; and
output the reconstructed digital image.

2. The apparatus of claim 1, wherein the apparatus is caused to receive the input data, reconstruct the digital image and output the reconstructed digital image for a plurality of digital images in a collection of digital images, and
wherein the sample locations of the point samples vary across at least some of the digital images of the collection.

3. The apparatus of claim 1, wherein the apparatus being caused to perform the convolution-based, point-sample encoding includes the apparatus being caused to:
convolve a kernel with a binary sample representation of the digital image to generate a convolution result as the encoding, the kernel including a grid of pixels each of which has a value representing a distance of the pixel from a center pixel of the kernel.

4. The apparatus of claim 3, wherein the display pixels include sampled display pixels corresponding to respective point samples, and unsampled display pixels,
wherein the binary sample representation includes pixels corresponding to sampled display pixels, and pixels corresponding to unsampled display pixels, each pixel that corresponds to a sampled display pixel having a binary value of 1, and each pixel that corresponds to an unsampled display pixel having a binary value of 0.

5. The apparatus of claim 3, wherein the convolution result is representable as a multi-bit binary integer in which each bit corresponds to a respective display pixel in an area about the selected display pixel, and in which a bit value of 1 indicates the presence of a point sample at the respective display pixel, and a bit value of 0 indicates the absence of a point sample at the respective display pixel.

6. The apparatus of claim 1, wherein the apparatus being caused to interpolate the value includes being caused to use the generated encoding to identify a set of point samples forming a polygon enclosing the selected display pixel, and interpolate the value of the selected display pixel based on the point samples of the respective set.

7. The apparatus of claim 6, wherein the apparatus being caused to use the generated encoding includes being caused to use the generated encoding to identify a set of three point samples, and interpolate the value includes performing a triangular interpolation.

8. A method comprising:
receiving input data for a digital image represented by a plurality of point samples at respective sample locations;
reconstructing the digital image from the input data for presentation by a display including a plurality of display pixels, the reconstruction including for each of at least some of the display pixels:
performing a convolution-based, point-sample encoding of a selected display pixel to generate an encoding that identifies point samples of the digital image nearby the selected display pixel; and
interpolating a value of the selected display pixel from at least some of the identified point samples using the generated encoding; and
outputting the reconstructed digital image.

9. The method of claim 8, wherein receiving the input data, reconstructing the digital image and outputting the reconstructed digital image occur for a plurality of digital images in a collection of digital images, and
wherein the sample locations of the point samples vary across at least some of the digital images of the collection.

10. The method of claim 8, wherein performing the convolution-based, point-sample encoding comprises:
convolving a kernel with a binary sample representation of the digital image to generate a convolution result as the encoding, the kernel including a grid of pixels each of which has a value representing a distance of the pixel from a center pixel of the kernel.

11. The method of claim 10, wherein the display pixels include sampled display pixels corresponding to respective point samples, and unsampled display pixels,
wherein the binary sample representation includes pixels corresponding to sampled display pixels, and pixels corresponding to unsampled display pixels, each pixel that corresponds to a sampled display pixel having a binary value of 1, and each pixel that corresponds to an unsampled display pixel having a binary value of 0.

12. The method of claim 10, wherein the convolution result is representable as a multi-bit binary integer in which each bit corresponds to a respective display pixel in an area about the selected display pixel, and in which a bit value of 1 indicates the presence of a point sample at the respective display pixel, and a bit value of 0 indicates the absence of a point sample at the respective display pixel.

13. The method of claim 8, wherein interpolating the value includes using the generated encoding to identify a set of point samples forming a polygon enclosing the selected display pixel, and interpolating the value of the selected display pixel based on the point samples of the respective set.

14. The method of claim 13, wherein using the generated encoding includes using the generated encoding to identify a set of three point samples, and interpolating the value includes performing a triangular interpolation.

15. A computer-readable storage medium that is non-transitory and has computer-readable program code portions stored therein that, in response to execution by a processor, cause an apparatus to at least:
receive input data for a digital image represented by a plurality of point samples at respective sample locations;
reconstruct the digital image from the input data for presentation by a display including a plurality of display pixels, the reconstruction including for each of at least some of the display pixels, the apparatus being caused to at least:
perform a convolution-based, point-sample encoding of a selected display pixel to generate an encoding that identifies point samples of the digital image nearby the selected display pixel; and
interpolate a value of the selected display pixel from at least some of the identified point samples using the generated encoding; and
output the reconstructed digital image.

16. The computer-readable storage medium of claim 15, wherein the apparatus is caused to receive the input data, reconstruct the digital image and output the reconstructed digital image for a plurality of digital images in a collection of digital images, and
wherein the sample locations of the point samples vary across at least some of the digital images of the collection.

17. The computer-readable storage medium of claim 15, wherein the apparatus being caused to perform the convolution-based, point-sample encoding includes the apparatus being caused to:
convolve a kernel with a binary sample representation of the digital image to generate a convolution result as the encoding, the kernel including a grid of pixels each of which has a value representing a distance of the pixel from a center pixel of the kernel.

18. The computer-readable storage medium of claim 17, wherein the display pixels include sampled display pixels corresponding to respective point samples, and unsampled display pixels,
wherein the binary sample representation includes pixels corresponding to sampled display pixels, and pixels corresponding to unsampled display pixels, each pixel that corresponds to a sampled display pixel having a binary value of 1, and each pixel that corresponds to an unsampled display pixel having a binary value of 0.

19. The computer-readable storage medium of claim 17, wherein the convolution result is representable as a multi-bit binary integer in which each bit corresponds to a respective display pixel in an area about the selected display pixel, and in which a bit value of 1 indicates the presence of a point sample at the respective display pixel, and a bit value of 0 indicates the absence of a point sample at the respective display pixel.

20. The computer-readable storage medium of claim 15, wherein the apparatus being caused to interpolate the value includes being caused to use the generated encoding to identify a set of point samples forming a polygon enclosing the selected display pixel, and interpolate the value of the selected display pixel based on the point samples of the respective set.

21. The computer-readable storage medium of claim 20, wherein the apparatus being caused to use the generated encoding includes being caused to use the generated encoding to identify a set of three point samples, and interpolate the value includes performing a triangular interpolation.

22. The apparatus of claim 1, wherein the apparatus being caused to interpolate the value includes being caused to interpolate the value of the selected display pixel from at least some but not all of the identified point samples using the generated encoding.

23. The method of claim 8, wherein interpolating the value includes interpolating the value of the selected display pixel from at least some but not all of the identified point samples using the generated encoding.

24. The computer-readable storage medium of claim 15, wherein the apparatus being caused to interpolate the value includes being caused to interpolate the value of the selected display pixel from at least some but not all of the identified point samples using the generated encoding.

* * * * *